United States Patent
Sivakumar et al.

(10) Patent No.: US 11,635,918 B2
(45) Date of Patent: Apr. 25, 2023

(54) DATA MIGRATION AND REPLICATION

(71) Applicant: INTERNATIONAL BUSINESS MACHINES CORPORATION, Armonk, NY (US)

(72) Inventors: Gandhi Sivakumar, Bentleigh (AU); Luke Peter Macura, Lucas (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/446,469

(22) Filed: Aug. 31, 2021

(65) Prior Publication Data

US 2023/0060369 A1 Mar. 2, 2023

(51) Int. Cl.
*G06F 3/06* (2006.01)
*G06F 9/455* (2018.01)

(52) U.S. Cl.
CPC ............ *G06F 3/0659* (2013.01); *G06F 3/067* (2013.01); *G06F 3/0613* (2013.01); *G06F 3/0619* (2013.01); *G06F 3/0665* (2013.01); *G06F 9/45541* (2013.01); *G06F 9/45558* (2013.01); *G06F 2009/45579* (2013.01)

(58) Field of Classification Search
CPC .. G06F 11/3438; G06F 21/552; G06F 21/604; G06F 21/6218; G06F 2221/2135; G06F 2221/2141; G06F 7/556
See application file for complete search history.

(56) References Cited

U.S. PATENT DOCUMENTS

| | | |
|---|---|---|
| 9,424,437 B1 | 8/2016 | Ancin |
| 10,019,181 B2 | 7/2018 | Singh |
| 10,140,036 B2 | 11/2018 | Kelner |
| 10,503,427 B2 | 12/2019 | Botes |
| 2018/0260125 A1 | 9/2018 | Botes |
| 2018/0321864 A1 | 11/2018 | Benisty |
| 2019/0042151 A1 | 2/2019 | Yang |
| 2019/0082010 A1 | 3/2019 | Friedman |
| 2020/0356536 A1 | 11/2020 | Nilsson |

(Continued)

OTHER PUBLICATIONS

Bernasconi, Angelo et al.; Implementation guide for IBM Spectrum Virtualize for Public Cloud Version 8.3; ibm.com/redbooks; Jun. 2019; 190 pages.

(Continued)

*Primary Examiner* — Yong J Choe
(74) *Attorney, Agent, or Firm* — Schmeiser, Olsen & Watts, LLP; Christopher Pignato

(57) ABSTRACT

A system, method, and computer program product for implementing data replication generation is provided. The method includes utilizing hardware and software resources within a hybrid cloud environment. A non-volatile memory host system and an associated target system are enabled for operational functionality and the non-volatile memory host system is connected to an I/O queueing component. In response, a plurality of queue structures is generated with respect to a host driver component and a connection between the non-volatile memory host system and the associated target system is detected. In response, a special purpose cache structure is generated and the plurality of queue structures and the special purpose cache structure are enabled such that remote data mirroring functionality is enabled.

25 Claims, 11 Drawing Sheets

(56) References Cited

U.S. PATENT DOCUMENTS

2020/0401316 A1   12/2020   Hankins
2021/0263677 A1    8/2021   Patel et al.

OTHER PUBLICATIONS

Mell, Peter et al.; "The NIST Definition of Cloud Computing;" National Institute of Standards and Technology; Special Publication 800-145; Sep. 2011; 7 pages.
PCT ISR dated Dec. 7, 2022, International application No. PCT/EP2022/072538, International filing date Aug. 11, 2022, 14 pages.
International Search Report and Written Opinion, PCT, Applicant's or agent's file reference P202007921, International application No. PCT/EP2022/072538, dated Jan. 30, 2023, International filing date Aug. 11, 2022, 16 pages.

DATA MIGRATION AND REPLICATION

BACKGROUND

The present invention relates generally to a method for generating or managing data replication in particular to a method and associated system for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. Typical hybrid cloud systems may be enabled to facilitate flexibility and portability for applications and data, thereby enabling an organization to meet its technical objectives more effectively and efficiently than it could with a public or private cloud alone. The aforementioned hybrid cloud systems may prevent typical storage systems from determining a nature of I/O systems based on a host identity and associated replication requirements of application data as it may be difficult to identify block data with respect to a dissimilar replication requirement. Likewise, current system architecture may be configured to replicate all volume data with respect to a public cloud instance. The aforementioned volume data replication process (i.e., blind data replications) may cause an amount of I/O being replicated to increase and associated resources may be consumed unnecessarily. Additionally, the aforementioned volume data replication process may increase network latency due to increased bandwidth consumption in combination with increased public cloud storage saving unnecessary data. Therefore, system 100 enables a process that enables a non-volatile (NVMe) hardware/software storage system and provides selective data replication administration within a multi cloud infrastructure thereby providing optimal resource utilization within a hybrid-cloud system. Likewise, system 100 comprises an NVMe capable storage system comprising a logical unit number (LUN) that is exposed to a hypervisor system that may be further segmented to a virtual machine (VM) and an application level at host interfaces within a hybrid cloud compute layer.

SUMMARY

A first aspect of the invention provides a non-volatile memory host system comprising a processor coupled to a computer-readable memory unit, the memory unit comprising instructions that when executed by the processor implements a data replication generation method comprising: utilizing, by the processor, hardware and software resources within a hybrid cloud environment; enabling, by the processor, the non-volatile memory host system and an associated target system for operational functionality; connecting, by the processor, the non-volatile memory host system to an I/O queueing component; generating, by the processor in response to the connecting, a plurality of queue structures with respect to a host driver component; detecting, by the processor, a connection between the non-volatile memory host system and the associated target system; generating, by the processor in response to results of the detecting, a special purpose cache structure; and enabling, by the processor, the plurality of queue structures and the special purpose cache structure such that remote data mirroring functionality is enabled.

Some embodiments of the invention further provide a non-volatile memory host system for submitting I/O commands to an I/O submission queue and retrieving I/O responses from a completion queue. Likewise, some embodiments of the invention are configured to execute a control instruction set transmitted via an administrative queue with respect to an associated session and add I/O submission queue and the completion queue to the hybrid cloud environment. Further embodiments of the invention are configured to adding or remove the I/O submission queue and the completion queue to or from the hybrid cloud environment. These embodiments advantageously provide an effective means for accurately enabling selective data replication administration within a multi cloud infrastructure providing optimal hardware and software resource utilization within a hybrid-cloud system.

A second aspect of the invention provides non-volatile memory host system comprising a processor coupled to a computer-readable memory unit, the memory unit comprising instructions that when executed by the processor implements a data replication management method comprising: running, by the processor, instances of a cloud structure mapped with an associated bare metal hypervisor, wherein the instances are comprised by a hybrid cloud environment; updating, by the processor, a metadata function for maintaining a list of I/O queues enabled for remote data mirroring functionality based on an executed process at a target module for receiving an I/O reservation matrix for the non-volatile memory host system; validating, by the processor, application entities of the non-volatile memory host system with respect to results of the updating; mapping, by the processor, associated data replication requirements with updated I/O requests received by a host driver of the non-volatile memory host system; and enabling, by the processor in response to the mapping, the host driver and the non-volatile memory host system such that I/O functionality is enabled.

Some embodiments of the invention further provide a non-volatile memory host system for initiating and sharing multiple I/O queues with respect to a storage array and parallel I/O transmission functionality. Likewise, some embodiments of the invention are configured to detect an I/O entity processing I/O within a respective CPU core and transfer I/O queue information to a replication daemon within a block storage array structure. These embodiments advantageously provide an effective means for accurately enabling selective data replication administration within a multi cloud infrastructure providing optimal hardware and software resource utilization within a hybrid-cloud system.

A third aspect of the invention provides a data replication system generation method comprising: utilizing, by a processor of a non-volatile memory host system, hardware and software resources within a hybrid cloud environment; enabling, by the processor, the non-volatile memory host system and an associated target system for operational functionality; connecting, by the processor, the non-volatile memory host system to an I/O queueing component; generating, by the processor in response to the connecting, a plurality of queue structures with respect to a host driver component; detecting, by the processor, a connection between the non-volatile memory host system and the associated target system; generating, by the processor in response to results of the detecting, a special purpose cache structure; and enabling, by the processor, the plurality of queue structures and the special purpose cache structure such that remote data mirroring functionality is enabled.

Some embodiments of the invention further provide a process for submitting I/O commands to an I/O submission queue and retrieving I/O responses from a completion queue. Likewise, some embodiments of the invention are configured to execute a control instruction set transmitted via an administrative queue with respect to an associated session and add I/O submission queue and the completion queue to the hybrid cloud environment. Further embodiments of the invention are configured to adding or remove the I/O submission queue and the completion queue to or from the hybrid cloud environment. These embodiments advantageously provide an effective means for accurately enabling selective data replication administration within a multi cloud infrastructure providing optimal hardware and software resource utilization within a hybrid-cloud system.

A fourth aspect of the invention provides a data replication management method comprising: running, by a processor of a non-volatile memory host system, instances of a cloud structure mapped with an associated bare metal hypervisor, wherein the instances are comprised by a hybrid cloud environment; updating, by the processor, a metadata function for maintaining a list of I/O queues enabled for remote data mirroring functionality based on an executed process at a target module for receiving an I/O reservation matrix for the non-volatile memory host system; validating, by the processor, application entities of the non-volatile memory host system with respect to results of the updating; mapping, by the processor, associated data replication requirements with updated I/O requests received by a host driver of the non-volatile memory host system; and enabling, by the processor in response to the mapping, the host driver and the non-volatile memory host system such that I/O functionality is enabled.

Some embodiments of the invention further provide a process for initiating and sharing multiple I/O queues with respect to a storage array and parallel I/O transmission functionality. Likewise, some embodiments of the invention are configured to detect an I/O entity processing I/O within a respective CPU core and transfer I/O queue information to a replication daemon within a block storage array structure. These embodiments advantageously provide an effective means for accurately enabling selective data replication administration within a multi cloud infrastructure providing optimal hardware and software resource utilization within a hybrid-cloud system.

A fifth aspect of the invention provides a computer program product, comprising a computer readable hardware storage device storing a computer readable program code, the computer readable program code comprising an algorithm that when executed by a processor of a non-volatile memory host system implements a data replication generation method, the method comprising: utilizing, by the processor, hardware and software resources within a hybrid cloud environment; enabling, by the processor, the non-volatile memory host system and an associated target system for operational functionality; connecting, by the processor, the non-volatile memory host system to an I/O queueing component; generating, by the processor in response to the connecting, a plurality of queue structures with respect to a host driver component; detecting, by the processor, a connection between the non-volatile memory host system and the associated target system; generating, by the processor in response to results of the detecting, a special purpose cache structure; and enabling, by the processor, the plurality of queue structures and the special purpose cache structure such that remote data mirroring functionality is enabled.

Some embodiments of the invention further provide a process for selecting a highest accuracy algorithm from multiple algorithms and assigning the highest accuracy algorithm as a final algorithm for execution. Likewise, some embodiments of the invention are configured to assign a rank to the final algorithm and select the final algorithm for execution with respect to updating central model code. These embodiments advantageously provide an effective means for accurately updating a currently deployed deep learning model without uploading any related data.

The present invention advantageously provides a simple method and associated system capable of generating or managing data replication.

DETAILED DESCRIPTION

Figure 1:
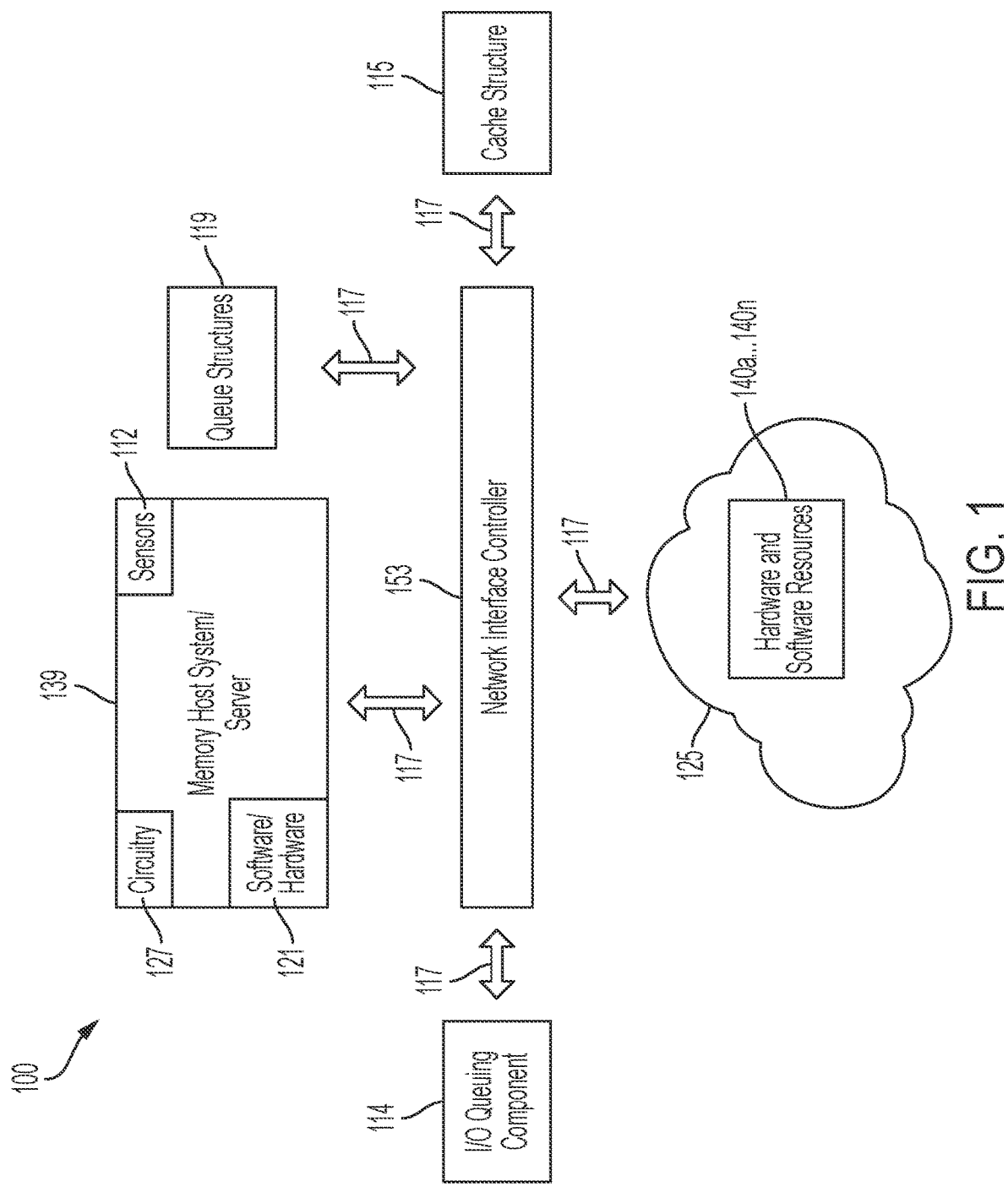
FIG. 1 illustrates a system for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled, in accordance with embodiments of the present invention.

FIG. 1 illustrates a system 100 for improving software and memory system technology associated with utilizing hardware and software resources 140a . . . 140n within a hybrid cloud environment 125 and enabling a non-volatile memory host system 139 and an associated target system for operational functionality; connecting the non-volatile memory host system 139 to an I/O queueing component 114 and generating queue structures 119 with respect to a host driver component; and enabling the queue structures and a generated special purpose cache structure 115 such that remote data mirroring functionality is enabled, in accordance with embodiments of the present invention. Typical hybrid cloud systems may be enabled to facilitate flexibility and portability with respect to software applications and associated data for enabling an organization to meet associated technical objectives more effectively and efficiently than usage of a public or private cloud independently. Current hybrid cloud implementation models comprise multiple hosts subsystems accessing a block storage system for performing READ and WRITE operations from host layers. The aforementioned hybrid cloud implementation model inefficiently uses cloud resources thereby increasing deployment traffic as multiple public cloud resources are being accessed. Likewise, it may be difficult to logically segment a data volume based on a replication requirement while maintaining data consistency across multiple storage interfaces within public and private cloud systems. Therefore, system 100 enables a process and associated system operationally compatible with non-volatile memory (NVMe) storage systems thereby enabling selective data replication administration within a multi cloud infrastructure. Likewise, system 100 enables optimal resource utilization functionality within a hybrid-cloud system. System 100 comprises an NVMe capable storage system comprising logical unit numbers (LUNs) exposed to a hypervisor system being segmented to a virtual machine (VM) at an application level with respect to host interfaces within a hybrid cloud compute layer.

System 100 enables the following functionality:

1. Optimally utilizing hardware and software resources 140a . . . 140n within a hybrid-cloud environment 125 by selecting application-based block data replication attributes using I/O (input/output) queueing (IOQ) mapping functionality with respect to frontend and replication hardware and software targets within a hybrid cloud.

2. Enabling an NVMe host and target module such that LUNs are exposed to a hypervisor segmented with respect to a VM and application level processes enabled by host interfaces within a hybrid cloud computing layer.

3. Creating queues when a IOQ connection is established via usage of a host driver.

4. Creating a special purpose queue in response to an association/host connection SUCCESS with respect to a target module.

5. Running (within a host) instances of a cloud mapped with an associated BareMetal hypervisor.

6. Updating a metadata function to maintain a list of IOQs enabled for remote data mirroring functionality based on an executed process at a target module configured to receive an IOQ reservation matrix for the host.

7. Validating software application entities and mapping replication requirements with respect to upcoming I/O requests when a new I/O is detected by a host driver.

System 100 of FIG. 1 includes a memory host system/server 139, hardware/software resources 140a . . . 140n (within a hybrid-cloud environment 125), an I/O queueing component 114, a cache structure 115, queue structures 119, and network interface controller 153 interconnected through a network 117. Memory host system/server 139 comprises sensors 112, circuitry 127, and software/hardware 121. Hardware/software resources 140a . . . 140n (within hybrid-cloud environment 125) may comprise any type of hardware and software systems that are necessary for assisting with operation of memory host system/server 139. For example, hardware/software resources 140a . . . 140n may include, inter alia, CPU resources, memory resources, data acquisition resources, control hardware resources, software module resources, operating system resources, etc. I/O queueing component 114 comprises a hardware/software queue component. Queue structures 119 comprise hardware/software queue structures for performing queue functions. Cache structure 115 comprises a hardware/software cache component Memory host system/server 139, hardware/software resources 140a . . . 140n, I/O queueing component 114, cache structure 115, and queue structures 119 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, memory host system/server 139, hardware/software resources 140a . . . 140n, I/O queueing component 114, cache structure 115, and queue structures 119 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for utilizing hardware and software resources 140a . . . 140n within a hybrid cloud environment 125 and enabling a non-volatile memory host system 139 and an associated target system for operational functionality; connecting the non-volatile memory host system 139 to an I/O queueing component 114 and generating queue structures 119 with respect to a host driver component; and enabling the queue structures and a generated special purpose cache structure 115 such that remote data mirroring functionality is enabled. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 117 may include any type of network including, inter alia, a local area network, (LAN), a wide area network (WAN), the Internet, a wireless network, etc.

System 100 is enabled to execute non-volatile memory over fabrics (NVMe-oF) protocols for enabling multiple I/O queues for scheduled I/O operation from a host system to a storage system. For example, a maximum of 65000 queues may be supported by an NVMe with 64000 entries within each queue. A host driver is configured to create queues in response to an established connection. When the host driver is detected to be connected to a target system, a special purpose queue is generated with respect to an administrator queue enabled by a host to generate I/O queues based on specified system requirements. Subsequently, the host may establish multiple I/O queues with respect to a single controller comprising a same not quite nitro (NQN) such as an AI that may enable automated tasks and bot commands on a server such as, inter alia, welcoming new members, moderating content, banning rule breakers, etc. Likewise, the host may include multiple mapped namespace (or volumes). When I/O queues are established, I/O commands are submitted to an I/O submission queue (SQ) and associated I/O responses are collected from a completion queue (CQ). The I/O queues may be added or removed via execution of a control instruction transmitted via an administrator queue for associated sessions.

System 100 enables a host Bare Metal hypervisor system to generate multiple I/O queues comprising a storage array to receive parallel I/O transmission benefits. The multiple I/O queues comprise information maintained within an NVMe driver of a Bare Metal host. The information is used to transmit I/O via specific I/O queues based on the defined policies. System 100 allows designation of a specified set of I/O queues between an initiator and target device eligible for data replication across cloud structures. In this case, a host's NVMe drive is configured to select some of the I/O queues for remote block storage replication and associated information is transmitted to a storage controller for a selection of the I/O queues. Communications between hosts and storage targets (in a private cloud IT instance) are enabled via in-band protocol-based implementation or out-of-band API implementation. With respect to in-band protocol-based implementation, a command over an ADMIN_QUEUE is transmitted to a storage system with an I/O queue ID used for special purpose selective data replication.

System 100 enables a storage system to receive information associated with an I/O queue reservation for a host and accordingly manage a metadata function retaining a list of I/O queues enabled for remote data mirroring (or async copy operation within a target cloud). When a writing function associated with an I/O queue data structure has completed, an application error reporting (AER) message is transmitted to an initiator component to maintain a consistency of I/O queue information between the entities prior to initiating a data replication process. System 100 is configured to retain a thin layer of an I/O workload manager at a hypervisor layer. The I/O workload manager resides within an NVMe driver of a hypervisor OS that will control I/O forwarding across available I/O queues. When a new I/O is received by a host driver, it may easily validate application entities such that replication requirements may be mapped for an upcoming I/O request. A local filesystem and raw allocation may be maintained by a hypervisor such that category of an application is retained while translating it to a block I/O. When the category is received, category to replication classification management code is executed for enabling a cached map to specify a category type required for a replication policy at a block storage level. When associated information is articulated at a host's driver, a selection of an I/O queue is enabled for transmitting an I/O command to a target system. A selected I/O (e.g., READ/WRITE) command may be pushed to a fabric transmission means by the selected I/O queue. For example, if an application type comprises GOLD and an associated driver has reserved IOQ1, IOQ2, IOQ3 (i.e., I/O queues) for gold class applications, then each I/O coming from GOLD class applications are transmitted via IOQ1, IOQ2, or IOQ3 based on existing multipath policy override controls.

When an I/O is received by any NVMe implemented I/O queue at a storage system, an I/O queue entity may be configured to recall a processing step with respect to the I/O within a respective CPU core. During this phase, collected NVMe I/O queue information is captured by a replicator engine within driver code of an I/O stack and the queue information is be passed to a replication daemon within a block storage array. The replicator engine is configured to detect that an identity for the replicator engine associated with the received I/O and map the identity with pre-collected host enabled I/O queues associated with the replication daemon. I/O queue mapping is simultaneously performed and if a host I/O is received from a replicate I/O queue, then the replication daemon will be executed to ensure I/O for a respective set of legal block addresses (LBAs) for moving to a public cloud instance to maintain required copies of data.

Each I/O retrieved from a set of designated I/O queues is replicated to a public cloud in an associated relationship. Subsequently, a remote copy mechanism ensures that all blocks comprising a defined new WRITE LBA, are moved to secondary site such that data consistency is achieved. During disaster recovery situations at a primary storage site, a volume may have duplicate data available at a remote storage site as LBA matching is consistent across the storage sites during in-flight replication. Therefore, data replication is performed for only select designated NVMe I/O queues for an associated volume thereby reducing replication traffic and increasing processing and storage capacity at a remote public cloud instance.

System 100 comprises a mechanism that includes an NVMe based cloud system and offers selective data replication administration within a multi cloud infrastructure with NVMe I/O queue selection for inter-site data replication. The mechanism further comprises optimal resources utilization within a hybrid-cloud system by selecting application-based block data replication using I/O queue mapping at a frontend and replication targets within in the hybrid cloud. The mechanism further includes an NVMe capable host and target system such that LUNs are exposed to a hypervisor system segmented with respect to a VM and application level at host interfaces within a hybrid cloud compute layer. A host driver is responsible to create queues when an the I/O queue connection is established.

Figure 2:
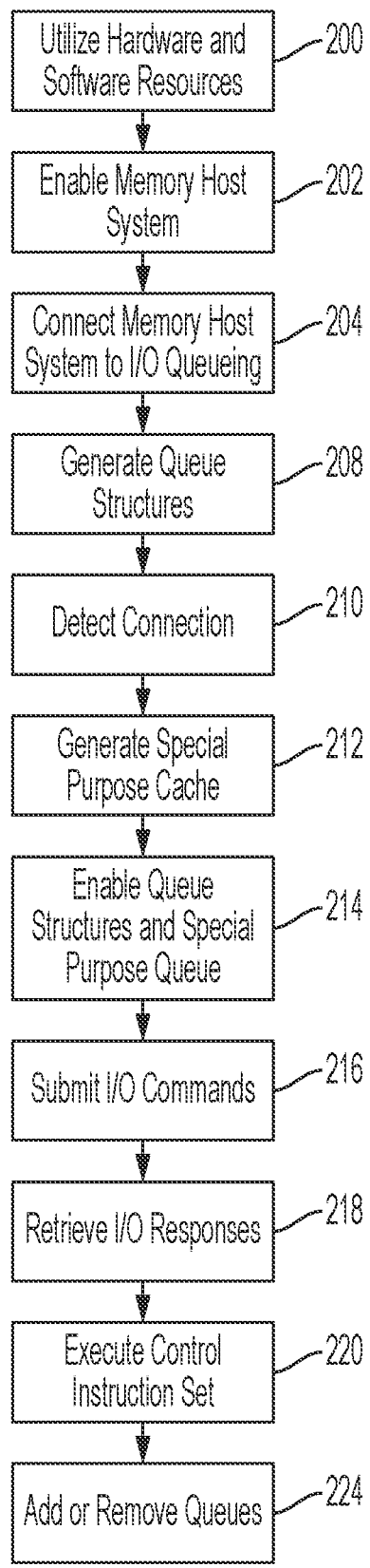
FIG. 2 illustrates an algorithm detailing a process flow enabled by the system of FIG. 1 for improving software and memory system technology associated with generating data replication code, in accordance with embodiments of the present invention.

FIG. 2 illustrates an algorithm detailing a process flow enabled by system 100 of FIG. 1 for improving software and memory system technology associated with generating data replication code, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by memory host system/server 139 and hardware/software resources 140*a* . . . 140*n*. In step 200, hardware and software resources are utilized (by a non-volatile memory host system) within a hybrid cloud environment. Utilizing the hardware and software resources may include selecting application-based block data replication code via execution of I/O queuing mapping code with respect to hardware and software frontend and replication targets within the hybrid cloud environment. Additionally, a logical unit number component may be executed with respect to a hypervisor segmented to an associated virtual machine at an application level with respect to host interfaces within the hybrid cloud environment.

In step 202, the non-volatile memory host system and an associated target system are enabled for operational functionality. In step 204, the non-volatile memory host system is connected to an I/O queueing component. In step 208, a plurality of queue structures is generated with respect to a host driver component in response to the connection of step 204. In step 210, a connection between the non-volatile memory host system and the associated target system is detected. In step 212, a special purpose cache structure is generated in response to results of step 210. In step 214, the plurality of queue structures and the special purpose cache structure are enabled such that remote data mirroring functionality is enabled. In step 216, I/O commands are submitted to an I/O submission queue of the plurality of queue structures. In step 218, I/O responses are retrieved from a completion queue of the plurality of queue structures in response to the I/O commands. In step 220, a control instruction set is executed. The control instruction set is transmitted via an administrative queue with respect to an associated session. In step 224, the I/O submission queue and the completion queue are added to said hybrid cloud environment in response to step 220. Alternatively, the I/O submission queue and the completion queue are removed from the hybrid cloud environment in response to step 220.

Figure 3:
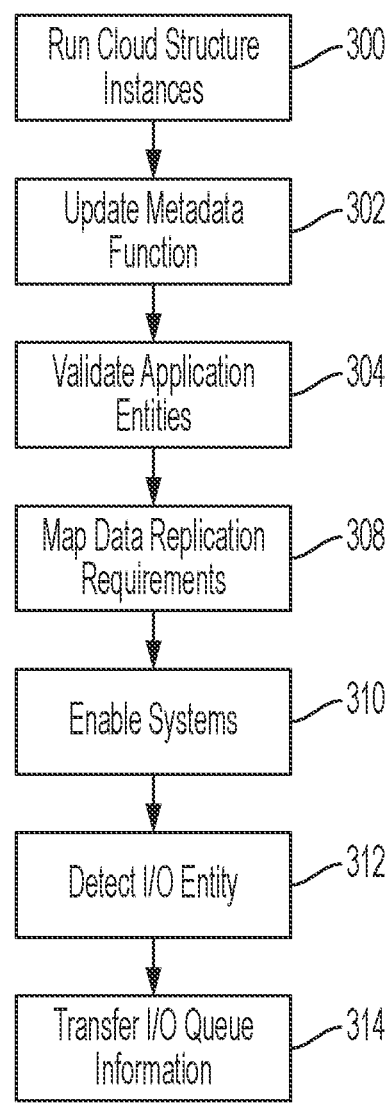
FIG. 3 illustrates an algorithm detailing a process flow enabled by the system of FIG. 1 for improving software and memory system technology associated with managing data replication code, in accordance with embodiments of the present invention.

FIG. 3 illustrates an algorithm detailing a process flow enabled by system 100 of FIG. 1 for improving software technology associated with managing data replication code, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by memory host system/server 139 and hardware/software resources 140a . . . 140n. In step 300, instances of a cloud structure mapped with an associated bare metal hypervisor are run by a non-volatile memory host system. The instances are comprised by a hybrid cloud environment. Running the instances of the cloud structure may include:
1. Initiating (via execution of the bare metal hypervisor) multiple I/O queues with respect to a storage array and parallel I/O transmission functionality.
2. Sharing IDs (associated with the multiple I/O queues) with the application entities.
3. Tracking said IDs allocated within a table within the host driver.
4. Applying policy definitions to an I/O manager for the multiple I/O queues.
5. Selecting an I/O queue from the multiple I/O queues based on application IDs for each incoming I/O request.

Running the instances of the cloud structure may further include:
1. Selecting (via execution of the host driver) the multiple I/O queues for remote block storage replication.
2. Transmitting (to a storage controller device) information associated with the selection.
3. Enabling communications between the non-volatile memory host system and storage system targets within a private cloud IT instance.

In step 302, a metadata function is updated for maintaining a list of I/O queues enabled for remote data mirroring functionality based on an executed process at a target module for receiving an I/O reservation matrix for the non-volatile memory host system. Updating the metadata function may include:
1. Transmitting (in response to completion of writing of an I/O data structure) an advanced error reporting (AER) message to an initiator entity for maintaining a consistency of I/O queue information between multiple entities prior to before initiating a replication process associated with the remote block storage replication.
2. Retaining a layer of an I/O workload manager within the host driver associated with I/O forwarding across available I/O queues of the plurality of queue structures.

In step 304, application entities of the non-volatile memory host system are validated with respect to results of the update of step 302. The validation process may include presenting (via execution of a cached map) a specified category associated with a replication policy type (at a block storage level) for associated data replication requirements.

In step 308, the associated data replication requirements are mapped with updated I/O requests received by a host driver of the non-volatile memory host system. In step 310, the host driver and the non-volatile memory host system are enabled (in response to the mapping of step 308) such that I/O functionality is enabled. In step 312, an I/O entity processing I/O within a respective CPU core is detected. In step 314, I/O queue information (captured by a selective replicator engine within driver code of an I/O stack) is transferred to a replication daemon within a block storage array structure.

Figure 4:
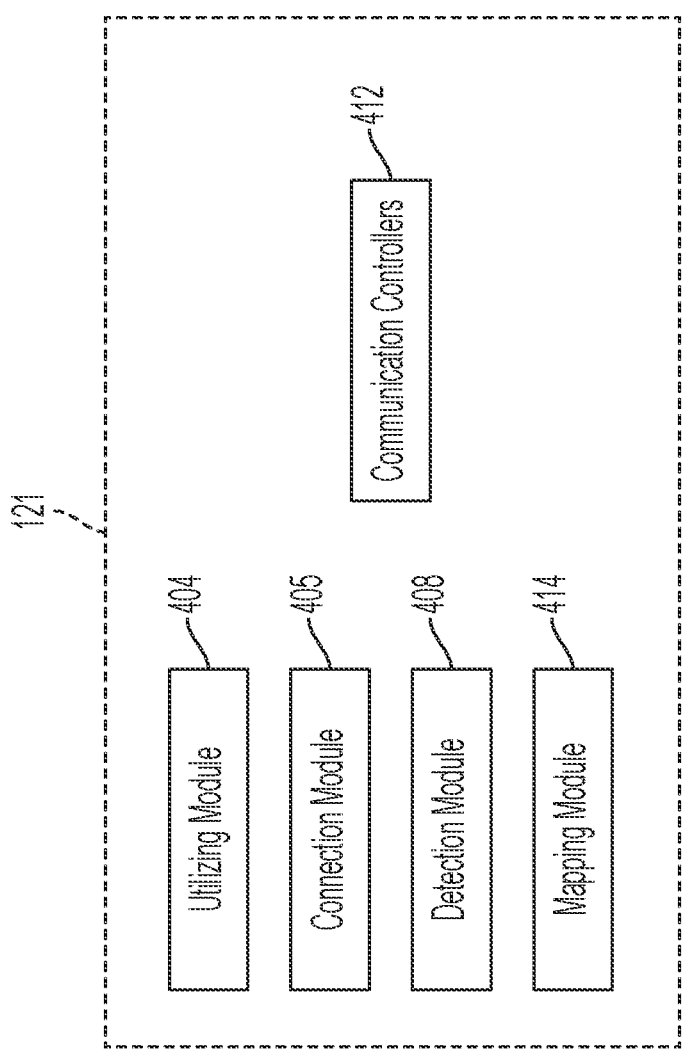
FIG. 4 illustrates an internal structural view of the software/hardware of FIG. 1, in accordance with embodiments of the present invention.

FIG. 4 illustrates an internal structural view of software/hardware 121 (i.e., 121) of FIG. 1, in accordance with embodiments of the present invention. Software/hardware 121 includes a utilizing module 404, a connection module 410, a detection module 408, a mapping module 414, and communication controllers 412. Utilizing module 404 comprises specialized hardware and software for controlling all functions related to the utilization steps of FIGS. 2 and 3. Connection module 405 comprises specialized hardware and software for controlling all functionality related to the connection steps described with respect to the algorithms of FIGS. 2 and 3. Detection module 408 comprises specialized hardware and software for controlling all functions related to the detection and enabling steps of FIGS. 2 and 3. Mapping module 414 comprises specialized hardware and software for controlling all functions related to the mapping steps of the algorithms of FIGS. 2 and 3. Communication controllers 412 are enabled for controlling all communications between utilizing module 404, connection module 405, detection module 408, and mapping module 414.

Figure 5:
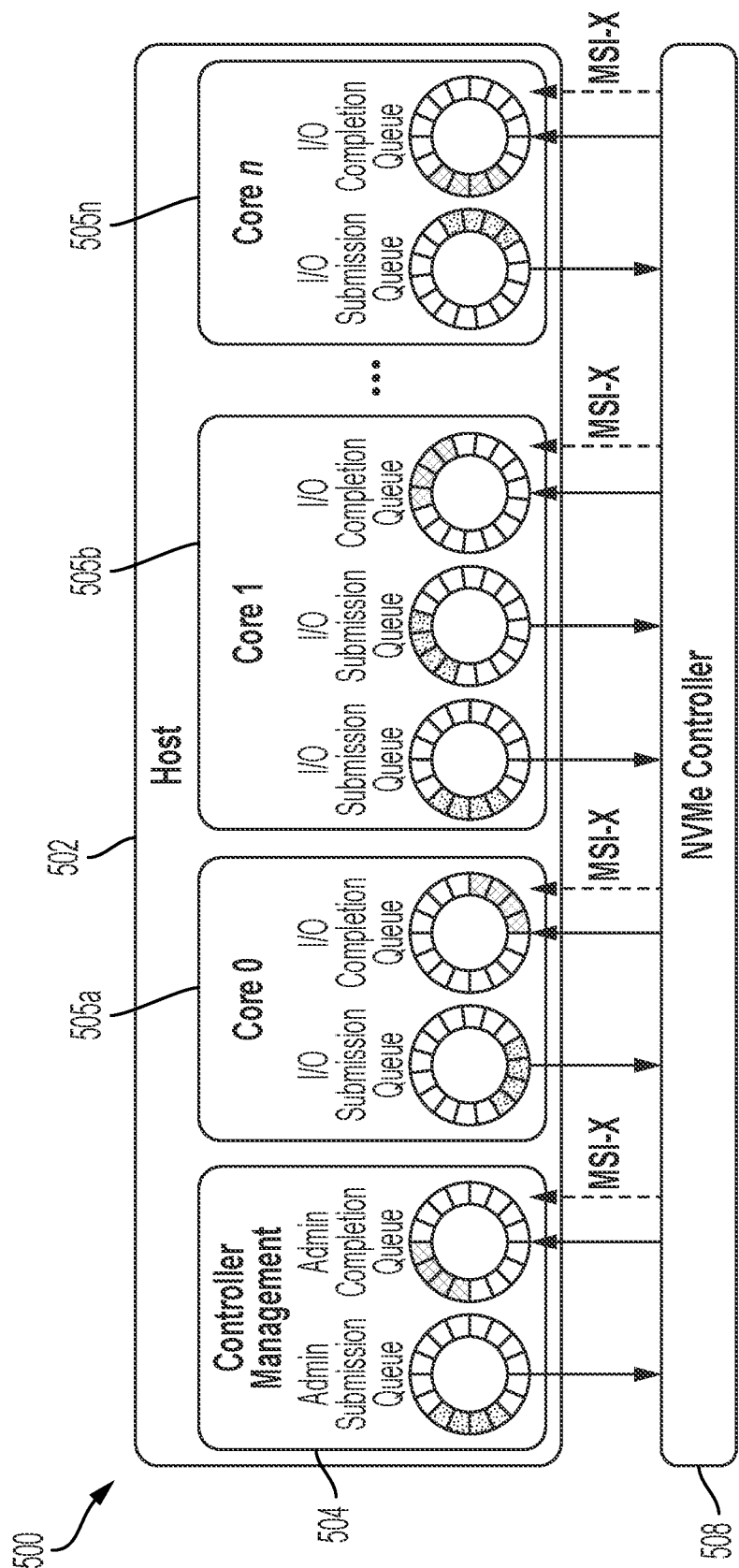
FIG. 5 illustrates an NVMe core to queue mapping system used by or comprised by the system of FIG. 1 for generating an I/O queue and selecting an associated operational mode, in accordance with embodiments of the present invention.

FIG. 5 illustrates an NVMe core to queue mapping system 500 used by or comprised by the system 100 of FIG. 1 for generating an I/O queue and selecting an associated operational mode, in accordance with embodiments of the present invention. NVMe core to queue mapping system 500 comprises a hypervisor driver system (i.e., host system 502) connected to a NVMe controller component 508. Host system 502 comprises a controller management component 504 and core components 505a . . . 505n.

Upon initialization of host 502:
1. An Initiate I/O queue CONNECT command is initiated when an associated connection (to NVMe controller component 508) is established.
2. A CREATE_ASSOC command is executed when host system 502 is connected to a target system.
3. A message is transmitted via a CREATE_ADMIN_QUEUE to the target system via execution of a TARGET NQN command.

When an ADMIN_QUEUE_CREATE_SUCCESS command is received:

1. An attempt to create an I/O queue is initiated via execution of an IOQ_CREATE instruction executed via an admin queue of controller management component 504.
2. A SEND IOQ_TYPE attribute command is transmitted during transmission of an IOQ create command. An associated type may include a REPLICATOR type. Likewise, a Wait for IOQ_CREATE_SUCCESS message may be received and an AER message may be decoded to determine a correctness of type.
3. If the target system is determined to be enabled for service functionality, then it will be succeeded with a special FLAG function.
4. If an IOQ_CREATE_FAILED command is received then the system is disabled as it is determined that the target system is not capable of functional operation. Otherwise, a multipath policy is initiated for transmission of an IOQ_CREATE message.

A target monitor and map updater processes is executed as follows:

Admin queue of controller management component 504 is polled for a new command and upon reception of an IOQ_CREATE command, a TYPE OPCODE is extracted from a command CDB. If a TYPE==NULL, then an Exit( );//host command is determined to be disassociated from a special replicator component. Likewise, if a type REPLICATOR IOQ is detected, then an IOQ_ID reservation is received for host system 502. Subsequently, an update metadata function is executed for keeping a list of I/O queue with remote data mirroring as functional. When writing function of an IOQ data structure has completed, then an AER message is transmitted to an initiator NQN and a data structure cache is updated.

Figure 6:
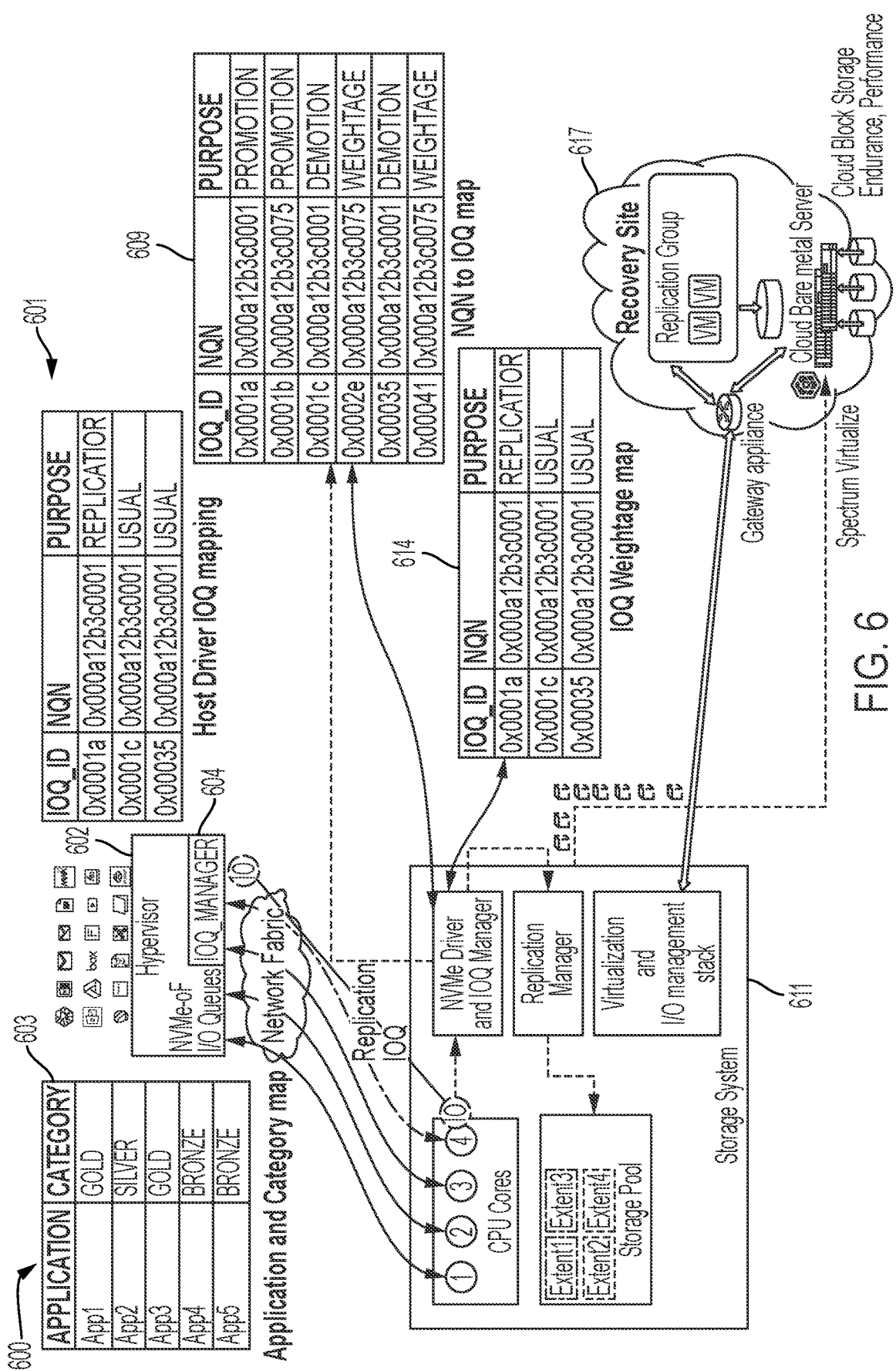
FIG. 6 illustrates a multipath policy update and initiator NVMe driver system, in accordance with embodiments of the present invention.

FIG. 6 illustrates a multipath policy update and initiator NVMe driver system 600, in accordance with embodiments of the present invention. Multipath policy update and initiator NVMe driver system 600 comprises a hypervisor component 602 (comprising an I/O queue manager 604) interconnected with a storage system 611 and a recovery site system 617. Multipath policy update and initiator NVMe driver system 600 generates an output, an application category structure 603, a host driver I/OQ ID mapping structure 607, an NQN to I/O queue structure 609, and an I/OQ weighting map structure 614. NVMe driver system 600 executes the following process:

At a hypervisor layer (i.e., of hypervisor component 602), a thin layer of I/O workload manager 604 component is initiated within an NVMe driver such that: a replicator data map is loaded, an I/O queue to application mapping process is performed, and application priorities are loaded for updating a multipath policy. When a new I/O is received by an initiator driver, application entities are validated and mapped with an associated category such that associated replication requirements are retrieved from mapping functions. Likewise, an IOQ_ID is selected based on a replicator category and an I/O is pushed to a selected IOQ_ID within an SQ. When an associated CQ message is received an associated I/O is marked as COMPLETE.

Figure 7:
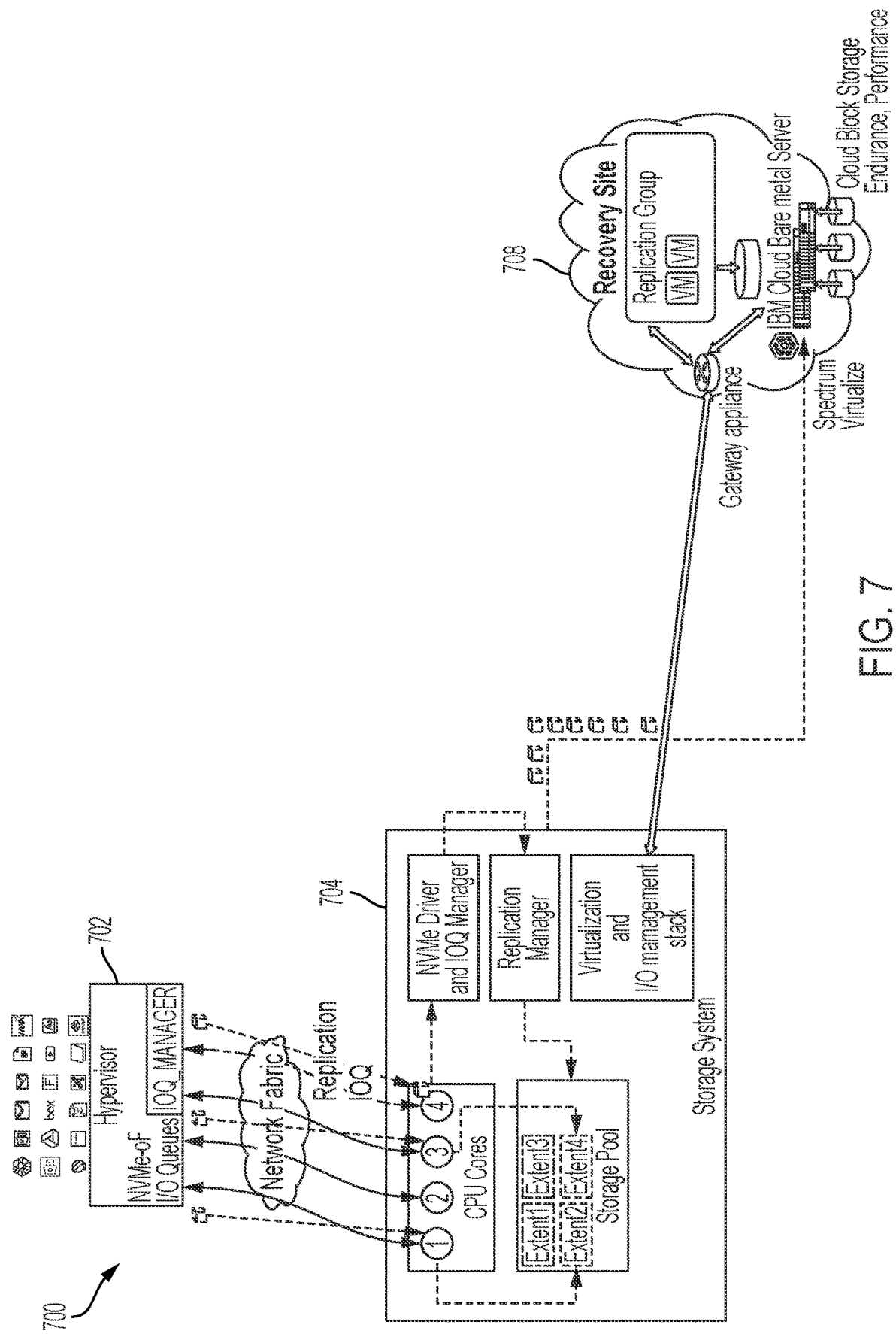
FIG. 7 illustrates target replicator and handling logic system, in accordance with embodiments of the present invention.

FIG. 7 illustrates target replicator and handling logic system 700, in accordance with embodiments of the present invention. Target replicator and handling logic system 700 comprises a hypervisor component 702, a storage system 704, and a recovery site system 708. Target replicator and handling logic system 700 executes the following process:

Upon reception of an I/O on an SQ, an IOQ_ID for a CPU core assignment is extracted. If an I/O comprises a READ operation, then there is no need of to execute replication with respect to a read operation. Subsequently, an IOQ_ID is retrieved from CPU_ASSIGNMENT_LOGIC and an IOQ_ID is passed to a replication daemon. The Replication daemon is configured to receive an IOQ_ID and map it with replication enabled I/O queues. If an associated I/O queue is enabled for replication, then: a remote copy operation is initiated; LBAs are extracted (with respect to a Vdisk UUID), replication relationship details and a remote Vdisk UUID are retrieved; an I/O is transmitted to a remote cluster in a relationship; and a replication process is marked as complete after an ACK message is received. Subsequently, an CQ message is transmitted in combination with a COMPLETION message and the operation is marked as complete.

Figure 8:
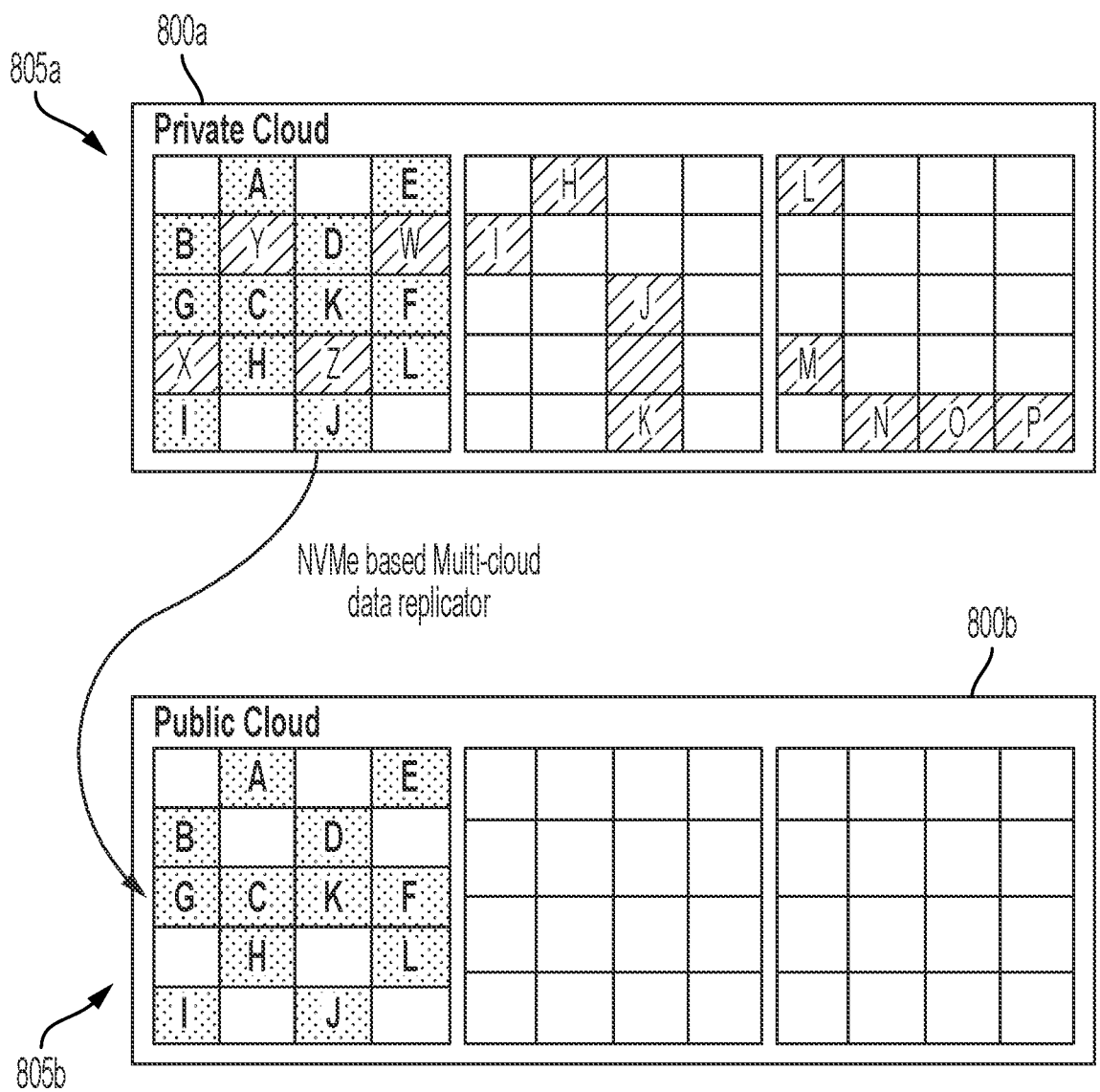
FIG. 8 illustrates private cloud architecture 800*a* and public cloud architecture 800*b*, in accordance with embodiments of the present invention.

FIG. 8 illustrates private cloud architecture 800a and public cloud architecture 800b, in accordance with embodiments of the present invention. Private cloud architecture 800a comprises host subsystems pushing data to a primary site and associated Webpages. LBAs are updated at a primary site for all application data associated WRITE I/Os. Public cloud architecture 800b comprises only specified grains being copied such that pages are reduced and all data saved with respect to a specified class of applications is fully present at a replicator site thereby increasing system efficiency.

Figure 9:
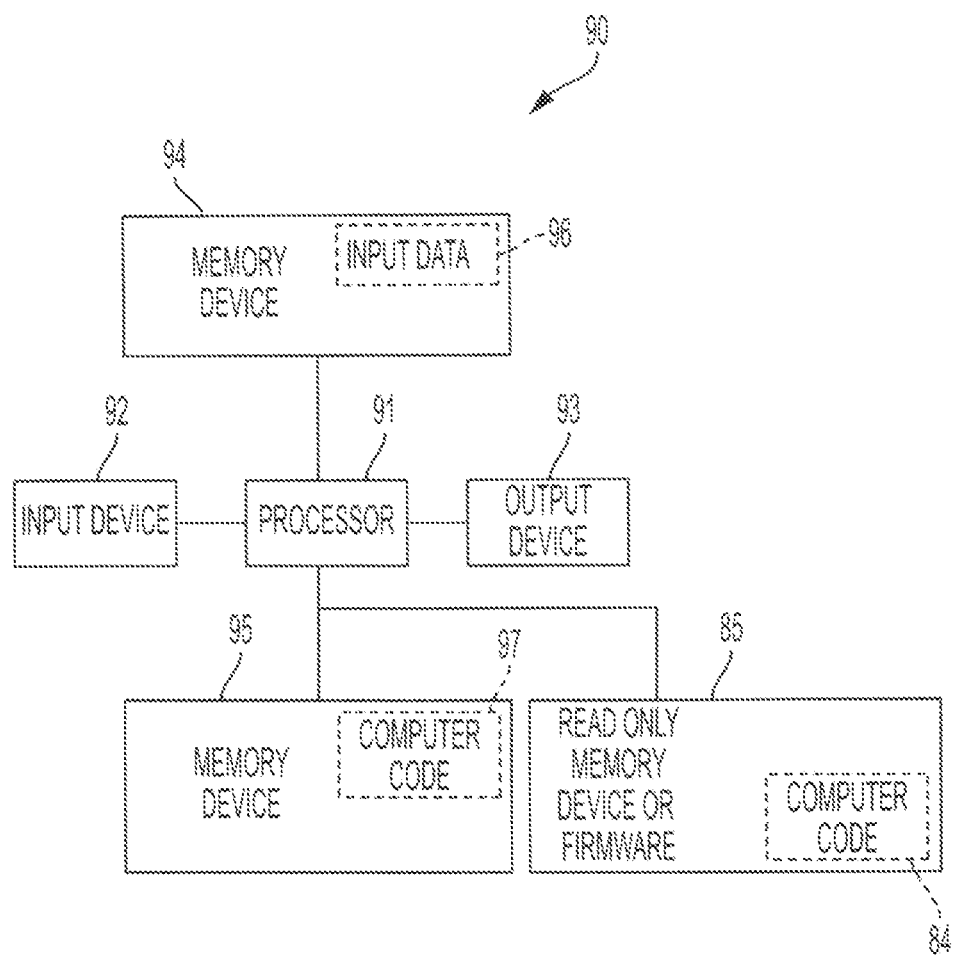
FIG. 9 illustrates a computer system used by the system of FIG. 1 for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled, in accordance with embodiments of the present invention.

FIG. 9 illustrates a computer system 90 (e.g., memory host system/server 139 and hardware/software resources 140a . . . 140n of FIG. 1) used by or comprised by the system 100 of FIG. 1 for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 9 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2 and 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. In another embodiment, the invention provides a business method that performs the process steps of the invention on a subscription, advertising, and/or fee basis. That is, a service supplier, such as a Solution Integrator, could offer to enable a process for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
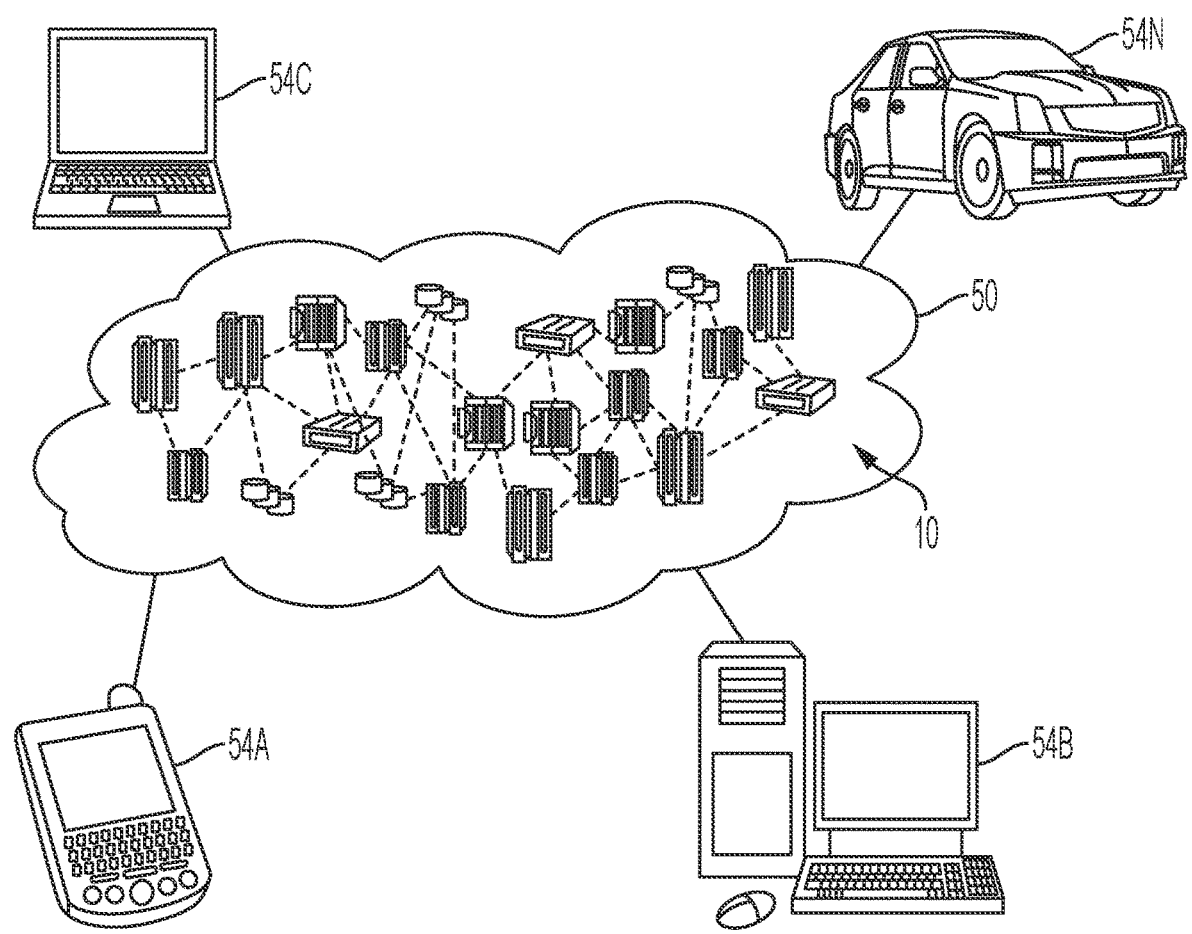
FIG. 10 illustrates a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 11:
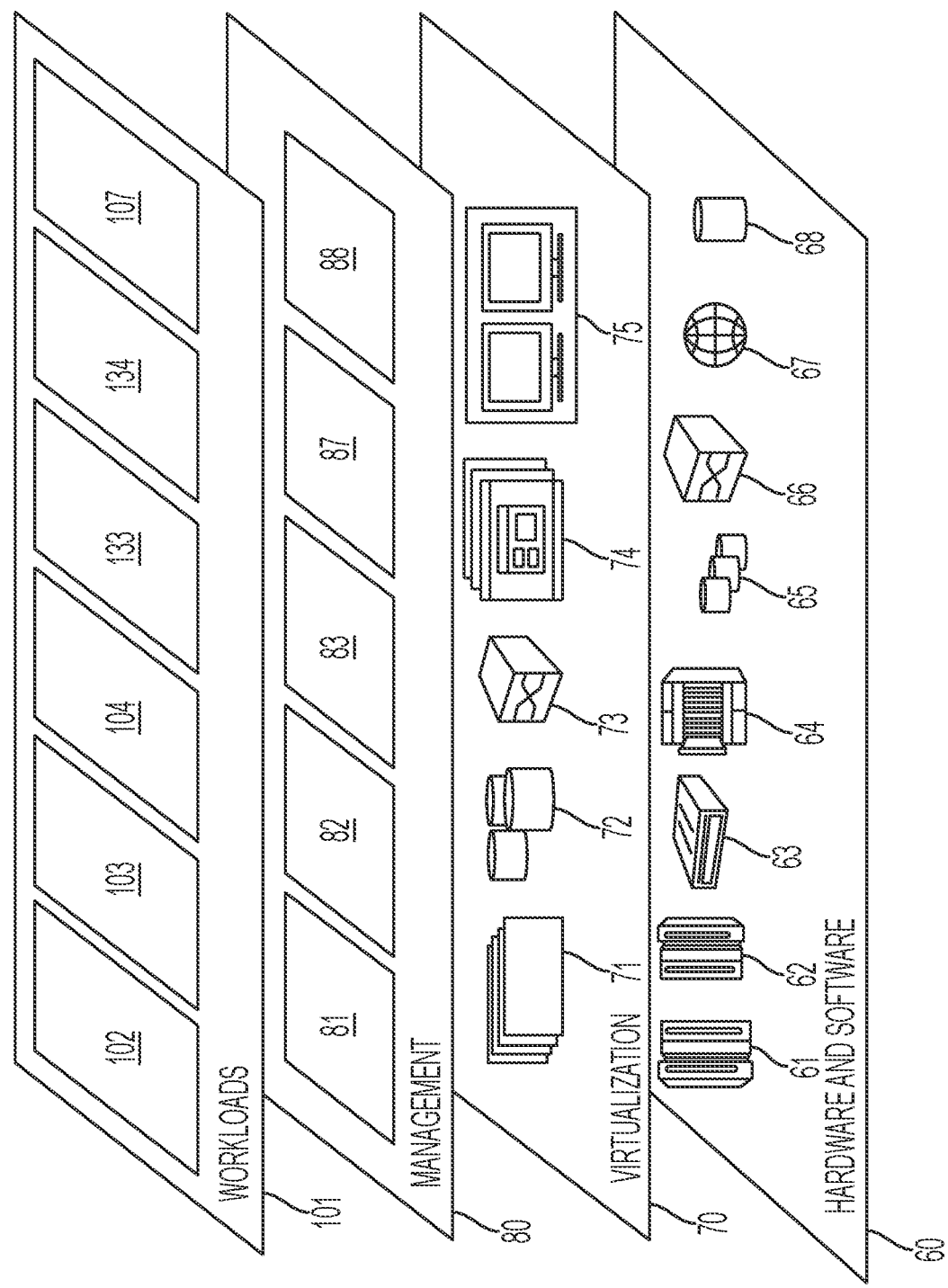
FIG. 11 illustrates a set of functional abstraction layers provided by cloud computing environment, in accordance with embodiments of the present invention.

Referring now to FIG. 11, a set of functional abstraction layers provided by cloud computing environment 50 (see FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A non-volatile memory host system comprising a processor coupled to a computer-readable memory unit, the computer-readable memory unit comprising instructions that when executed by the processor implements a data replication generation method comprising:
   utilizing, by said processor, hardware and software resources within a hybrid cloud environment;
   enabling, by said processor, said non-volatile memory host system and an associated target system for operational functionality;
   connecting, by said processor, said non-volatile memory host system to an input/output (I/O) queueing component;
   generating, by said processor in response to said connecting, a plurality of queue structures with respect to a host driver component;
   detecting, by said processor, a connection between said non-volatile memory host system and said associated target system;
   generating, by said processor in response to results of said detecting, a special purpose cache structure; and
   enabling, by said processor, said plurality of queue structures and said special purpose cache structure such that remote data mirroring functionality is enabled.

2. The non-volatile memory host system of claim 1, wherein said utilizing said hardware and software resources comprises selecting application-based block data replication code via execution of I/O queuing mapping code with respect to hardware and software frontend and replication targets within said hybrid cloud environment.

3. The non-volatile memory host system of claim 1, wherein logical unit number components are executed with respect to a hypervisor segmented to an associated virtual machine at an application level with respect to host interfaces within said hybrid cloud environment.

4. The non-volatile memory host system of claim 1, wherein said method further comprises:
   submitting, by said processor, I/O commands to an I/O submission queue of said plurality of queue structures; and
   retrieving, by said processor in response to said I/O commands, I/O responses from a completion queue of said plurality of queue structures.

5. The non-volatile memory host system of claim 4, wherein said method further comprises:
   executing, by said processor, a control instruction set transmitted via an administrative queue with respect to an associated session; and
   adding, by said processor in response to said executing, said I/O submission queue and said completion queue to said hybrid cloud environment.

6. The non-volatile memory host system of claim 4, wherein said method further comprises:
   executing, by said processor, a control instruction set transmitted via an administrative queue with respect to an associated session; and
   removing, by said processor in response to said executing, said I/O submission queue and said completion queue from said hybrid cloud environment.

7. A non-volatile memory host system comprising a processor coupled to a computer-readable memory unit, the computer-readable memory unit comprising instructions that when executed by the processor implements a data replication management method comprising:
   running, by said processor, instances of a cloud structure mapped with an associated bare metal hypervisor, wherein said instances are comprised by a hybrid cloud environment;
   updating, by said processor, a metadata function for maintaining a list of input/output (I/O) queues enabled for remote data mirroring functionality based on an executed process at a target module for receiving an I/O reservation matrix for said non-volatile memory host system;
   validating, by said processor, application entities of said non-volatile memory host system with respect to results of said updating;
   mapping, by said processor, associated data replication requirements with updated I/O requests received by a host driver of said non-volatile memory host system; and
   enabling, by said processor in response to said mapping, said host driver and said non-volatile memory host system such that I/O functionality is enabled.

8. The non-volatile memory host system of claim 7, wherein said running said instances of said cloud structure comprises:
   initiating, by said processor via execution of said bare metal hypervisor, multiple I/O queues with respect to a storage array and parallel I/O transmission functionality;
   sharing, by said processor, IDs associated with said multiple I/O queues with said application entities;
   tracking, by said processor, said IDs allocated within a table within said host driver;
   applying, by said processor, policy definitions to an I/O manager for said multiple I/O queues; and
   selecting, by said processor, an I/O queue from said multiple I/O queues based on application IDs for each incoming I/O request.

9. The non-volatile memory host system of claim 8, wherein said running said instances of said cloud structure further comprises:
   selecting, by said processor via execution of said host driver, said multiple I/O queues for remote block storage replication;
   transmitting, by said processor to a storage controller device, information associated with said selecting; and
   enabling, by said processor, communications between said non-volatile memory host system and storage system targets within a private cloud IT instance.

10. The non-volatile memory host system of claim 7, wherein said updating said metadata function comprises:
    transmitting, by said processor in response to completion of writing of an I/O data structure, an advanced error reporting (AER) message to an initiator entity for maintaining a consistency of I/O queue information between multiple entities prior to before initiating a replication process associated with said remote block storage replication; and
    retaining, by said processor, a layer of an I/O workload manager within said host driver associated with I/O forwarding across available I/O queues of said plurality of queue structures.

11. The non-volatile memory host system of claim 7, wherein said validating comprises:
  presenting, by said processor executing a cached map, a specified category associated with a replication policy type, at a block storage level, for said associated data replication requirements.

12. The non-volatile memory host system of claim 7, wherein said method further comprises:
  detecting, by said processor, an I/O entity processing I/O within a respective central processing unit (CPU) core; and
  transferring, by said processor, I/O queue information, captured by a selective replicator engine within driver code of an I/O stack, to a replication daemon within a block storage array structure.

13. A data replication system generation method comprising:
  utilizing, by a processor of a non-volatile memory host system, hardware and software resources within a hybrid cloud environment;
  enabling, by said processor, said non-volatile memory host system and an associated target system for operational functionality;
  connecting, by said processor, said non-volatile memory host system to an input/output (I/O) queueing component;
  generating, by said processor in response to said connecting, a plurality of queue structures with respect to a host driver component;
  detecting, by said processor, a connection between said non-volatile memory host system and said associated target system;
  generating, by said processor in response to results of said detecting, a special purpose cache structure; and
  enabling, by said processor, said plurality of queue structures and said special purpose cache structure such that remote data mirroring functionality is enabled.

14. The method of claim 13, wherein said utilizing said hardware and software resources comprises selecting application-based block data replication code via execution of I/O queuing mapping code with respect to hardware and software frontend and replication targets within said hybrid cloud environment.

15. The method of claim 13, wherein logical unit number components are executed with respect to a hypervisor segmented to an associated virtual machine at an application level with respect to host interfaces within said hybrid cloud environment.

16. The method of claim 13, further comprising:
  submitting, by said processor, I/O commands to an I/O submission queue of said plurality of queue structures; and
  retrieving, by said processor in response to said I/O commands, I/O responses from a completion queue of said plurality of queue structures.

17. The method of claim 16, further comprising:
  executing, by said processor, a control instruction set transmitted via an administrative queue with respect to an associated session; and
  adding, by said processor in response to said executing, said I/O submission queue and said completion queue to said hybrid cloud environment.

18. The method of claim 16, further comprising:
  executing, by said processor, a control instruction set transmitted via an administrative queue with respect to an associated session; and
  removing, by said processor in response to said executing, said I/O submission queue and said completion queue from said hybrid cloud environment.

19. The method of claim 13, further comprising:
  providing at least one support service for at least one of creating, integrating, hosting, maintaining, and deploying computer-readable code in the non-volatile memory host system, said code being executed by the processor to implement: said utilizing, said enabling said non-volatile memory host system, said connecting, said generating said plurality of queue structures, said detecting, said generating said special purpose cache structure, and said enabling said aid plurality of queue structures and said special purpose cache structure.

20. A data replication management method comprising:
  running, by a processor of a non-volatile memory host system, instances of a cloud structure mapped with an associated bare metal hypervisor, wherein said instances are comprised by a hybrid cloud environment;
  updating, by said processor, a metadata function for maintaining a list of input/output (I/O) queues enabled for remote data mirroring functionality based on an executed process at a target module for receiving an I/O reservation matrix for said non-volatile memory host system;
  validating, by said processor, application entities of said non-volatile memory host system with respect to results of said updating;
  mapping, by said processor, associated data replication requirements with updated I/O requests received by a host driver of said non-volatile memory host system; and
  enabling, by said processor in response to said mapping, said host driver and said non-volatile memory host system such that I/O functionality is enabled.

21. The method of claim 20, wherein said running said instances of said cloud structure comprises:
  initiating, by said processor via execution of said bare metal hypervisor, multiple I/O queues with respect to a storage array and parallel I/O transmission functionality;
  sharing, by said processor, IDs associated with said multiple I/O queues with said application entities;
  tracking, by said processor, said IDs allocated within a table within said host driver;
  applying, by said processor, policy definitions to an I/O manager for said multiple I/O queues; and
  selecting, by said processor, an I/O queue from said multiple I/O queues based on application IDs for each incoming I/O request.

22. The method of claim 21, wherein said running said instances of said cloud structure further comprises:
  selecting, by said processor via execution of said host driver, said multiple I/O queues for remote block storage replication;
  transmitting, by said processor to a storage controller device, information associated with said selecting; and
  enabling, by said processor, communications between said non-volatile memory host system and storage system targets within a private cloud IT instance.

23. The method of claim 20, wherein said updating said metadata function comprises:
  transmitting, by said processor in response to completion of writing of an I/O data structure, an advanced error reporting (AER) message to an initiator entity for maintaining a consistency of I/O queue information between multiple entities prior to before initiating a replication process associated with said remote block storage replication; and retaining, by said processor, a layer of an I/O workload manager within said host driver associated with I/O forwarding across available I/O queues of said plurality of queue structures.

24. The method of claim 20, wherein said validating comprises:

presenting, by said processor executing a cached map, a specified category associated with a replication policy type, at a block storage level, for said associated data replication requirements.

25. A computer program product, comprising a computer readable hardware storage device storing a computer readable program code, said computer readable program code comprising an algorithm that when executed by a processor of a non-volatile memory host system implements a data replication generation method, said method comprising:

utilizing, by said processor, hardware and software resources within a hybrid cloud environment;

enabling, by said processor, said non-volatile memory host system and an associated target system for operational functionality;

connecting, by said processor, said non-volatile memory host system to an input/output (I/O) queueing component;

generating, by said processor in response to said connecting, a plurality of queue structures with respect to a host driver component;

detecting, by said processor, a connection between said non-volatile memory host system and said associated target system;

generating, by said processor in response to results of said detecting, a special purpose cache structure; and enabling, by said processor, said plurality of queue structures and said special purpose cache structure such that remote data mirroring functionality is enabled.

* * * * *